United States Patent
Liu

(10) Patent No.: US 10,449,821 B2
(45) Date of Patent: Oct. 22, 2019

(54) AUTOMOBILE CORNERING ROLLOVER PREVENTION CONTROL SYSTEM AND CONTROL METHOD THEREFOR

(71) Applicant: YANCHENG INSTITUTE OF TECHNOLOGY, Yancheng, Jiangsu Province (CN)

(72) Inventor: Fuhao Liu, Yancheng (CN)

(73) Assignee: Yancheng Institute of Technology, Yancheng, Jiangsu Province (CN)

( * ) Notice: Subject to any disclaimer, the term of this patent is extended or adjusted under 35 U.S.C. 154(b) by 84 days.

(21) Appl. No.: 15/319,876

(22) PCT Filed: Dec. 30, 2015

(86) PCT No.: PCT/CN2015/099886
§ 371 (c)(1),
(2) Date: Dec. 19, 2016

(87) PCT Pub. No.: WO2016/107581
PCT Pub. Date: Jul. 7, 2016

(65) Prior Publication Data
US 2017/0120714 A1 May 4, 2017

(30) Foreign Application Priority Data
Dec. 31, 2014 (CN) .......................... 2014 1 0854931

(51) Int. Cl.
*B60G 17/016* (2006.01)
*B60G 17/0165* (2006.01)
(Continued)

(52) U.S. Cl.
CPC ....... *B60G 17/0162* (2013.01); *B60G 17/016* (2013.01); *B60G 17/019* (2013.01);
(Continued)

(58) Field of Classification Search
CPC .............. B60G 17/0162; B60G 21/073; B60G 17/0152; B60G 17/019; B60G 17/04;
(Continued)

(56) References Cited

U.S. PATENT DOCUMENTS

| | | | | |
|---|---|---|---|---|
| 2002/0013645 A1* | 1/2002 | Badenoch | .......... | B60G 17/0162 701/37 |
| 2012/0212043 A1* | 8/2012 | Miyata | .................... | B60T 7/042 303/9.62 |
| 2014/0058625 A1* | 2/2014 | Sun | .................... | B60G 17/0162 701/38 |

FOREIGN PATENT DOCUMENTS

| | | |
|---|---|---|
| CN | 101041320 | 9/2007 |
| CN | 201410927 | 2/2010 |

(Continued)

OTHER PUBLICATIONS

Translation of CN101670765 obtained via Espacenet on Jun. 21, 2018. (Year: 2006).*

(Continued)

*Primary Examiner* — Jeffrey C Boomer
(74) *Attorney, Agent, or Firm* — Rankin, Hill & Clark LLP

(57) ABSTRACT

An automobile cornering rollover prevention control system includes a controller, four hydraulic oil cylinders, a deflection measuring instrument and a rotation speed measuring instrument. The controller is mounted inside the automobile, and includes a data acquisition module, a data processing module and a data execution module, wherein the data acquisition module and the data execution module are connected to the data processing module, an input end of the data acquisition module is electrically connected to the deflection measuring instrument and the rotation speed measuring instrument, and an output end of the data execution module is connected to control ends of the four hydraulic oil cylinders is connected to control ends of the four hydrau- (Continued)

lic oil cylinders respectively. The deflection measuring instrument and the rotation speed measuring instrument are mounted on a left front wheel of the automobile, and two hydraulic oil cylinders are mounted between an automobile frame and a front axle, and the other two hydraulic oil cylinders are mounted between the automobile frame and a rear axle.

3 Claims, 5 Drawing Sheets

(51) Int. Cl.
B60G 17/0195 (2006.01)
B60G 17/015 (2006.01)
B60G 17/019 (2006.01)
B60G 17/04 (2006.01)
B60G 21/073 (2006.01)

(52) U.S. Cl.
CPC ..... *B60G 17/0152* (2013.01); *B60G 17/0165* (2013.01); *B60G 17/0195* (2013.01); *B60G 17/04* (2013.01); *B60G 21/073* (2013.01); *B60G 2400/0511* (2013.01); *B60G 2400/0521* (2013.01); *B60G 2400/208* (2013.01); *B60G 2400/41* (2013.01); *B60G 2800/0124* (2013.01)

(58) Field of Classification Search
CPC .............. B60G 17/016; B60G 17/0195; B60G 17/0165; B60G 2800/0124; B60G 2400/0511; B60G 2400/208; B60G 2400/41; B60G 2400/0521; H05K 999/99

See application file for complete search history.

(56) References Cited

FOREIGN PATENT DOCUMENTS

| CN | 101670765 | | 3/2010 | | |
|----|-----------|---|--------|---|---|
| CN | 101670765 A | * | 3/2010 | | |
| CN | 201456976 | | 5/2010 | | |
| CN | 201716191 U | * | 1/2011 | | |
| CN | 102092374 | | 6/2011 | | |
| CN | 202089015 | | 12/2011 | | |
| CN | 103204158 | | 7/2013 | | |
| CN | 103213582 | | 7/2013 | | |
| CN | 103381796 | | 11/2013 | | |
| CN | 104709026 | | 7/2015 | | |
| DE | 10260385 A1 | * | 9/2004 | ........... | B60R 21/214 |
| GB | 2418648 A | * | 4/2006 | ........... | B60G 17/016 |
| WO | 2009051740 | | 4/2009 | | |

OTHER PUBLICATIONS

Translation of Abstract of CN201716191U obtained via Espacenet on Jun. 27, 2018. (Year: 2011).*
Translation of Abstract of DE10260385 obtained via Espacenet on Jun. 27, 2018. (Year: 2004).*
International Search Report filed in PCT/CN2015/099886 dated Jun. 6, 2016.

* cited by examiner

AUTOMOBILE CORNERING ROLLOVER PREVENTION CONTROL SYSTEM AND CONTROL METHOD THEREFOR

TECHNICAL FIELD

The present invention relates to an automobile cornering rollover prevention control method and system, and more particularly, to an automobile cornering rollover prevention control system and control method therefor in case of driving by a front wheel.

BACKGROUND

Nowadays, with the development of economy and great improvement of people's living standard, automobiles substantially have gone into thousands of households. The automobile has became a major mode of transportation, and no matter a family automobile or a large freight car and a loading vehicle have occupied half of the transportation industry depending on irreplaceable advantages thereof. However, the greatly increased number of automobiles bring a great test to the transportation safety. Rollover is a major accident form of passenger cars. When a rollover accident occurs, a tragedy of mass death and casualty is caused in most cases, which severely affects the healthy and stable development of a harmonious society. It can be known through statistics, research, and analysis to rollover accidents that the rollover accidents of the passenger cars easily occur to the following roads: 1. a spiral road at an entrance of a viaduct; 2. cornering positions of an express way and an urban traffic road; and 3. sudden turn under emergency (for example, a passenger car in the front brakes suddenly, a pedestrian runs out from a roadside in the front suddenly, and the passenger car in a hurry needs to conduct sudden turn). Therefore, the rollover safety of the passenger car becomes a research hotspot of major passenger car enterprises and scientific research institutions; meanwhile, it is also a main difficulty on an automobile research aspect about how to prevent rollover during cornering and improve the driving safety of the passenger car.

Chinese Patent 200920157324.0 (CN201410927Y) discloses an automobile having a rollover prevention system, and the rollover prevention system includes two left passive hydraulic pumps; a deceleration transmission device, an output end thereof being respectively connected to a plunger of the left initiative hydraulic pump and a plunger of the right initiative hydraulic pump, so that the plunger of the left initiative hydraulic pump and the plunger of the right initiative hydraulic pump move reversely along the same route; a servo motor used for driving the deceleration transmission device; and a control device connected to the servo motor and sending a corresponding signal according to a driving condition of the automobile so as to command the servo motor to operate correspondingly; wherein, the controller includes a trigger device, a control circuit with a trigger switch, a servo motor and a travel switch triggered by the deceleration transmission mechanism. The rollover prevention system is an independent system with specific characteristics, for example, a centre of gravity of the automobile can be quickly moved to a cornering side when the automobile corners suddenly, which effectively prevents the automobile from rollover; however, the major defect thereof is that: a mechanism itself is relatively complicated, an accumulated error exists in a transmission process, or breakdown of any part is possible to cause system failure, so as to affect the implementation of rollover prevention.

Chinese Patent 201310014617.4 (CN103204158A) discloses a method used for preventing automobile rollover, which includes: monitoring automobile declination through a declination sensor and inducing rollover of the automobile in a certain direction; determining the occurrence of rollover through a central processing unit arranged in a controller according to a declination threshold calculated; steering the automobile in a rollover direction induced, and controlling the steering through the controller; accelerating the automobile by changing a position of an accelerator through the steering, the accelerator being controlled through the controller; and braking the automobile through a brake when the rollover is induced to be reduced, the brake being controlled through the controller. Thus it can be seen that, in the method used for preventing automobile rollover disclosed by the patent application document, the automobile is accelerated through steering the automobile in the rollover direction induced and through changing the position of the accelerator in the same direction, so that the automobile is braked in the case that the rollover is induced to be reduced, so as to stabilize the automobile finally. Thus it can be seen that, although the method for preventing automobile rollover of the patent application may prevent automobile rollover, for other automobiles in travelling, especially for automobiles quickly driving on express ways and viaducts, emergent stop of any automobile is easy to cause a rear-end collision of an automobile thereafter, and ordered driving of the automobile thereafter cannot be guaranteed; therefore, the method used for preventing automobile rollover described in Chinese Patent 201310014617.4 is not especially suitable for usual automobiles, but is more suitable for racing automobiles.

SUMMARY

The object of the present invention is to provide an automobile cornering rollover prevention control system and control method thereof for solving the problem of the current technical solution that the automobile is easy to roll over when rounding a corner once the speed is improperly decreased.

The technical solution adopted by the present invention to solve the technical problem thereof is that: an automobile cornering rollover prevention control system powered up by an automobile power supply includes a controller, four hydraulic oil cylinders, a deflection measuring instrument and a rotation speed measuring instrument, wherein the controller is mounted inside the automobile, and includes a data acquisition module, a data processing module and a data execution module, both the data acquisition module and the data execution module are electrically connected to the data processing module, an input end of the data acquisition module is electrically connected to the deflection measuring instrument and the rotation speed measuring instrument respectively, and an output end of the data execution module is connected to control ends of the four hydraulic oil cylinders respectively; the deflection measuring instrument is mounted on a left front wheel of the automobile, the rotation speed measuring instrument is mounted on the left front wheel of the automobile, two of the four hydraulic oil cylinders are respectively mounted between an automobile frame and a front axle, and the other two of the four hydraulic oil cylinders are mounted between the automobile frame and a rear axle; and the four hydraulic oil cylinders are disposed pairwise and symmetrically. The data acquisition module is used for receiving a deflection angle fed back by the wheel deflection measuring instrument and a speed fed back by the rotation speed measuring instrument; the deflection measuring instrument is mounted on the left front wheel, and the rotation speed measuring instrument is mounted on the left front wheel; the data processing module calculates a value of position change of a centre of gravity at a current speed of the automobile and a safe threshold of the position change of the centre of gravity at the speed of the automobile, and compares the two values to determined rollover of the automobile; and the data execution module automatically controls working conditions of the four hydraulic oil cylinders according to an output result of the data processing module. According to the technical solution above, and compared with the prior arts, the present invention has the following advantages that: according to the automobile cornering rollover prevention control method described in the present invention, rollover prevention control can be conducted to the automobile through setting a specific central processing unit in the case that the driving speed of the automobile is unchanged, so as to improve the driving safety of the automobile. The present invention has positive effects to a rollover process of the automobile caused by collision.

Preferably, two initiation airbags are arranged between the automobile frame and the front axle, two initiation airbags are also arranged between the automobile frame and the rear axle, and control ends of the four initiation airbags are all electrically connected to the data execution module to play a role of temporary assistance.

Preferably, the wheel deflection measuring instrument is a wheel deflection measuring instrument that monitors automobile declination and induces a deflection angle $\theta_L$ of the automobile during instantaneous cornering, the rotation speed measuring instrument is a rotation speed measuring instrument that monitors a rotation speed of a wheel and induces a speed $v_L$ of the automobile during marching, and the controller is a controller that calculates a position change $\Delta a$ of a centre of gravity G at a current speed $v_L$ of the automobile so as to compare the change with a safe position change threshold of the centre of gravity G at the speed $v_L$ of the automobile, control the hydraulic oil cylinders to move, promote an automobile body to be lifted for a certain distance $\Delta h$ reversely to the position change $\Delta a$ of the centre of gravity G, and guarantee the safe driving of the automobile.

Preferably, the controller is an ECU.

Preferably, all the hydraulic oil cylinders are provided with a grating ruler for measuring an extending distance of the hydraulic oil cylinder, and an output end of the grating ruler is electrically connected to the data acquisition module.

An automobile cornering rollover prevention control method applicable to the automobile cornering rollover prevention control system above includes the following steps of:

step I, manually setting existing parameters that include a wheel base B and an axle base L, a standard centre of gravity G of an automobile body, and a safe position change threshold of the centre of gravity G, the standard centre of gravity G of the automobile body being composed of half wheel base data a and half axle base data b;

step II, obtaining a deflection angle $\theta_L$ of the wheel and a speed $v_L$ of a left front wheel by the automobile cornering rollover prevention control system during cornering, wherein $\theta_1$ is an included angle between a connecting line of an ascending section and a descending section of two front or rear hydraulic oil cylinders and a horizontal line; $\theta_2$ is an included angle between a connecting line of the positions of the centre of gravity before and after the change of the centre of gravity and the horizontal line; $h_1$ is a distance between the position of the centre of gravity before the change of the centre of gravity and the sections of the two front hydraulic cylinders; and $\theta_{G'}$ is an included angle between a connecting line of the position of the centre of gravity G' after the change and an instantaneous speed centre O, and a wheel axle, a speed $v_{G'}$ and a centripetal force $F_{G'}$ at the centre of gravity of the automobile:

$$v_{G'} = \frac{r_{G'}}{r_L} v_L,$$

$$F_{G'} = m \frac{v_{G'}^2}{r_{G'}},$$

calculating a centripetal force moment in an axle direction of the automobile according to the data above, which is $$T_G(\theta_1) = F_{G'}(h_1 + h_2 - \Delta h_1)\cos(\theta_{G'})$$

wherein when the automobile rolls over during concerning, an inside wheel leaves the ground; and a rollover torque of the automobile at the moment is $$T_{Gravity}(\theta_1) = \begin{cases} mg(a + \Delta a) & \text{turn left} \\ mg[B - (a + \Delta a)] & \text{turn right} \end{cases},$$

being concluded from equilibrium of forces:

$$T_G(\theta_1) = T_{Gravity}(\theta_1)$$

and finally obtaining a critical lifted distance $\Delta h_{Critical}$ $$\Delta h_{Critical} = c \tan(\theta_1)$$

and c is a distance between a mounting position of the hydraulic cylinder and an axis of symmetry of the automobile; and step III, executing actions, wherein a data processing module controls expansion links of four hydraulic oil cylinders to extend according to an output result of the data processing module, so that the lifted distance $\Delta h$ of the hydraulic oil cylinders of the automobile body reversely to a value of a position change of the centre of gravity is larger than a theoretically critical lifted distance $\Delta h_{Critical}$.

Preferably, the expansion links of the four hydraulic oil cylinders are fed back by the grating rulers in real time, and the expansion links of the four hydraulic oil cylinders are finely adjusted by the controller in real time.

Preferably, if the lifted distance $\Delta h$ of the hydraulic oil cylinders of the automobile body reversely to the value of the position change of the centre of gravity is smaller than the critical lifted distance $\Delta h_{Critical}$, then the controller sends a control signal to an instrument panel, and the instrument panel flashes for alarming, and the controller sends the signal to the initiation airbag of the automobile body reversely to the value of the position change of the centre of gravity, then the initiation airbag is initiated.

The present invention has the substantial effects of: being capable of conducting rollover prevention control to the automobile through setting the specific central processing unit in the case that the driving speed of the automobile is unchanged, so as to improve the driving safety of the automobile. The present invention has positive effects to the rollover process of the automobile caused by collision.

DETAILED DESCRIPTION

The technical solutions of the present invention are further described in details hereunder with reference to the specific embodiments and drawings.

Embodiment 1

Figure 1:
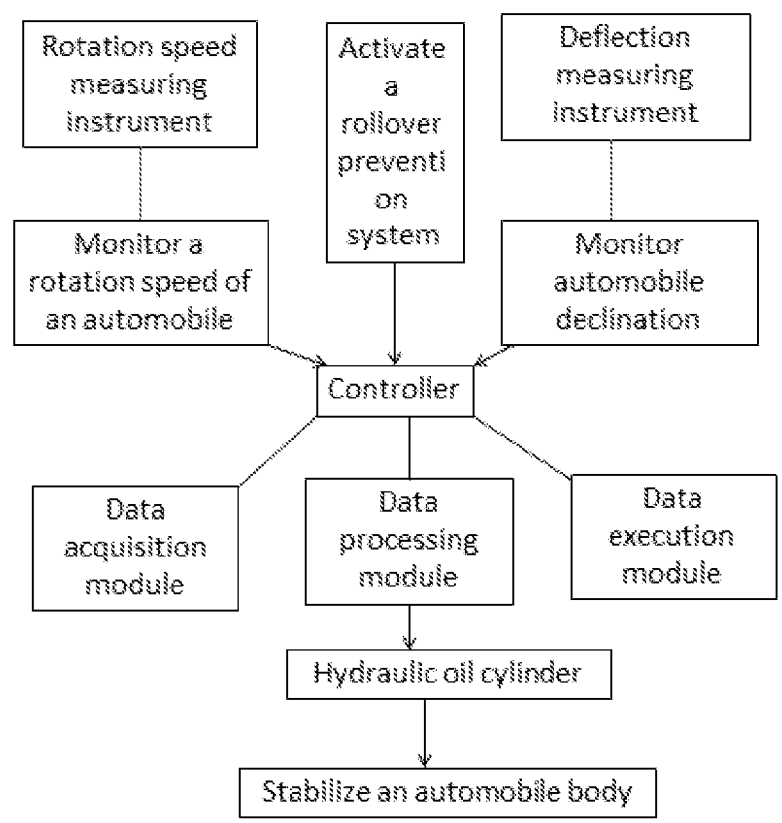
FIG. 1 is a module diagram of an automobile cornering rollover prevention control method according to the present invention.
Figure 2:
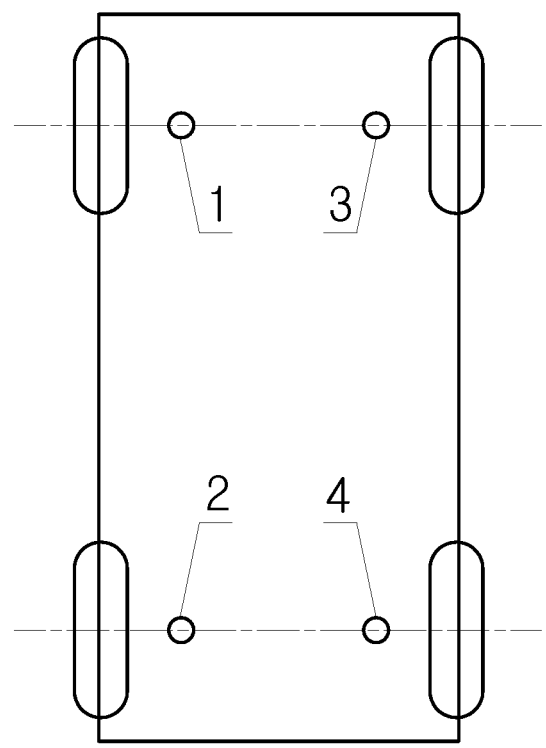
FIG. 2 is a structure diagram of an automobile having a cornering rollover prevention system according to the present invention.
Figure 3:
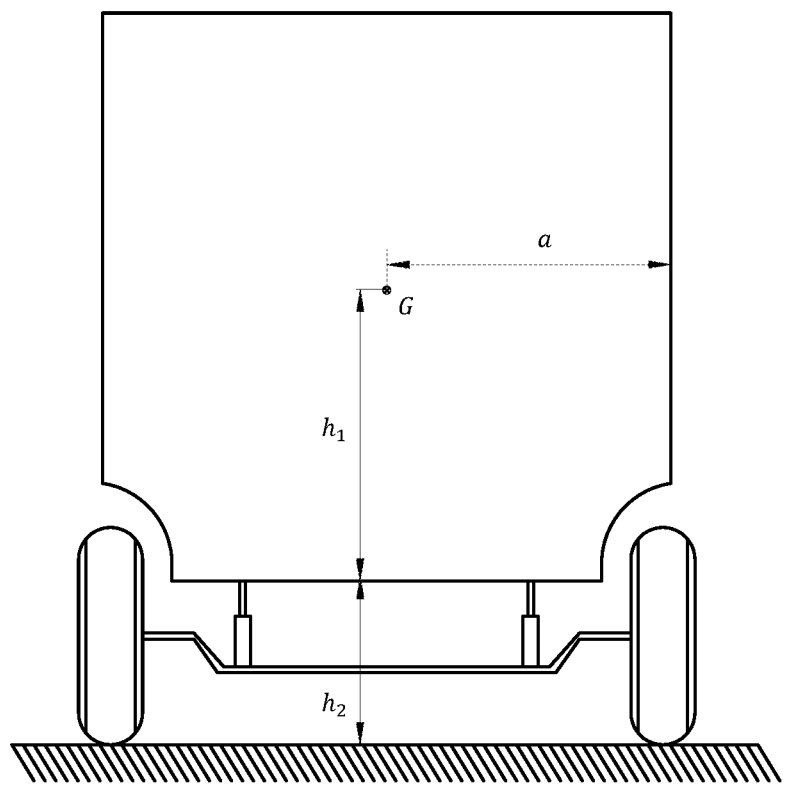
FIG. 3 is a front view of the automobile having the cornering rollover prevention system according to the present invention.
Figure 4:
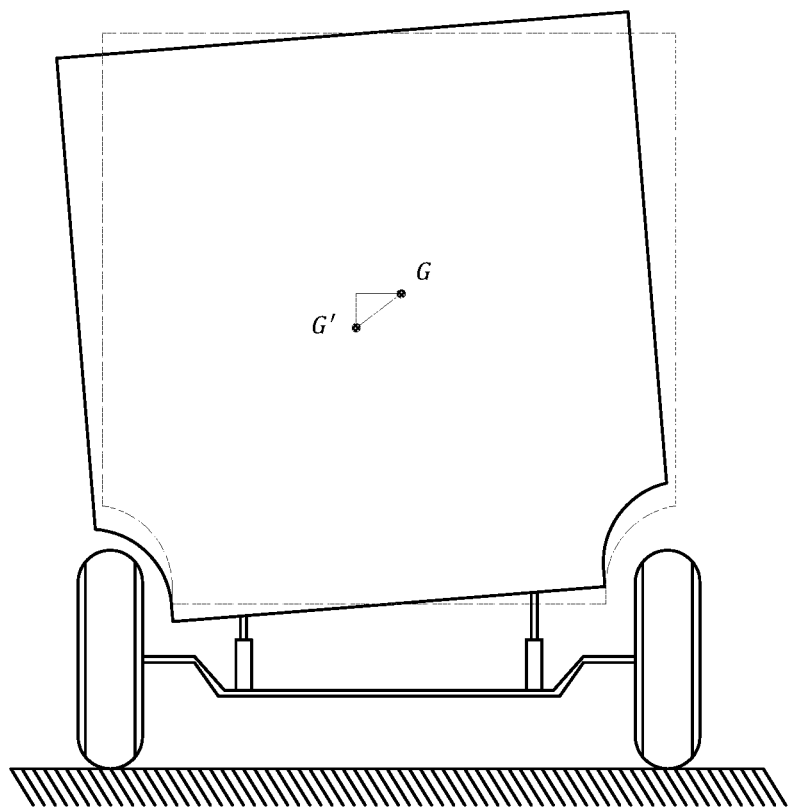
FIG. 4 is a block diagram of the automobile illustrated in FIG. 3 when turning left.
Figure 5:
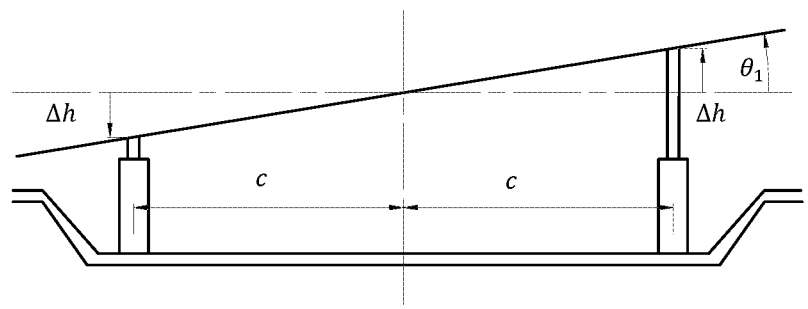
FIG. 5 is a partial enlarged diagram of a hydraulic oil cylinder portion of the automobile when turning left according to the present invention.
Figure 6:
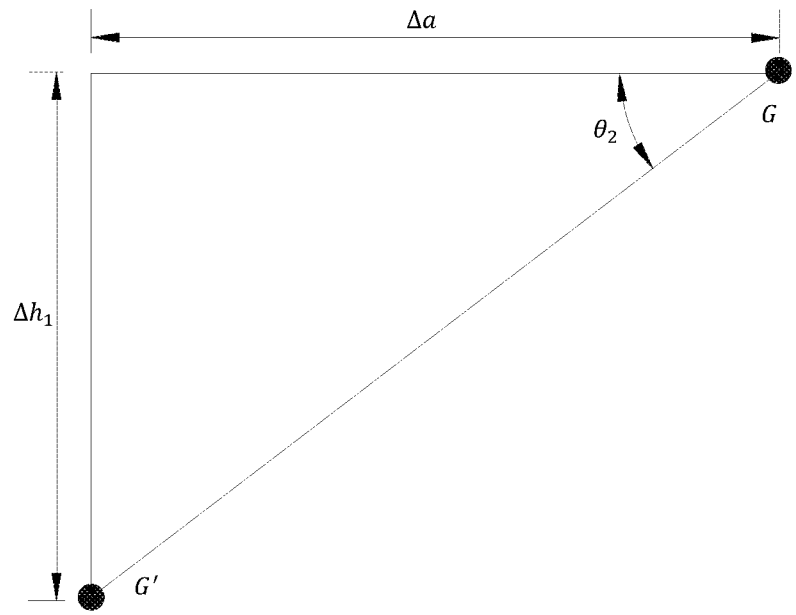
FIG. 6 is a partial enlarged diagram of a position change of a centre of gravity of an automobile body when the automobile according to the present invention turns left.
Figure 7:
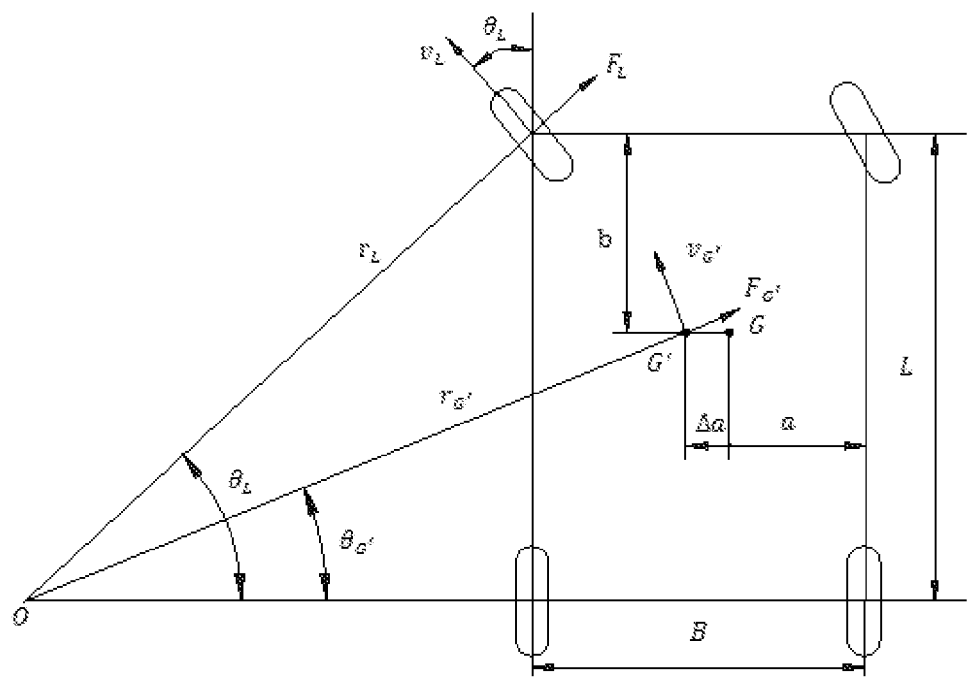
FIG. 7 is a simplified mechanics analysis diagram of the automobile with a deflection measuring instrument and a rotation speed measuring instrument mounted on a left front wheel when turning left.
Figure 8:
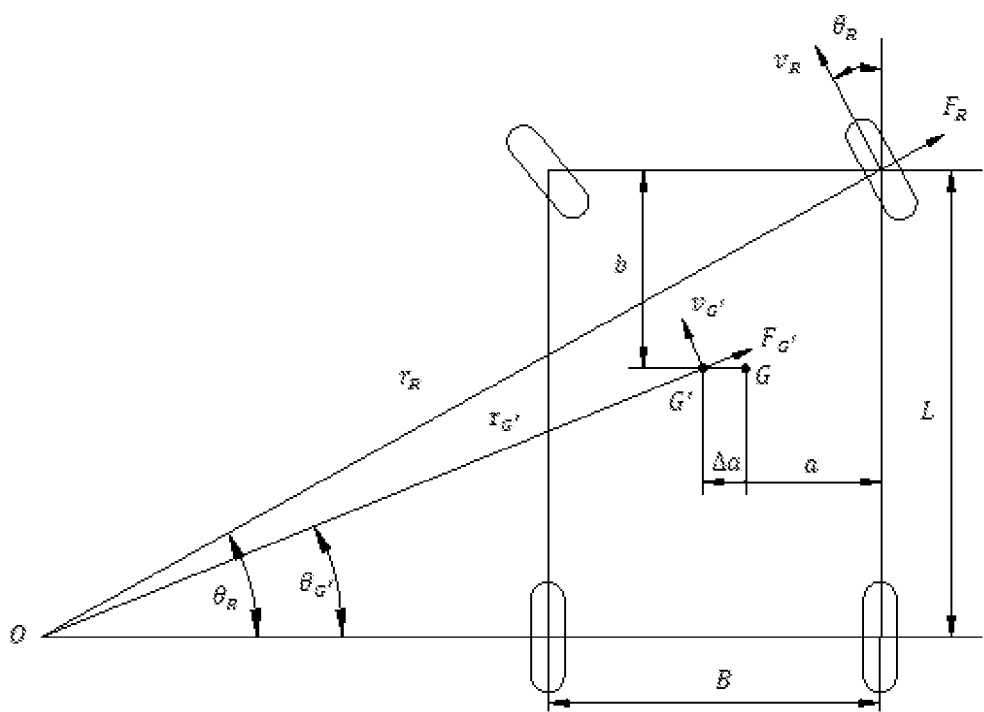
FIG. 8 is a simplified mechanics analysis diagram of the automobile with a deflection measuring instrument and a rotation speed measuring instrument mounted on a right front wheel when turning left, In the figures: 1 refers to left rear wheel; 2 refers to left front wheel; 3 refers to right rear wheel; and 4 refers to right front wheel.

An automobile cornering rollover prevention control system (refer to FIG. 1 to FIG. 8) powered up by an automobile power supply includes a controller, four hydraulic oil cylinders, a deflection measuring instrument and a rotation speed measuring instrument, wherein the controller is mounted inside the automobile, and includes a data acquisition module, a data processing module and a data execution module, both the data acquisition module and the data execution module are electrically connected to the data processing module, an input end of the data acquisition module is electrically connected to the deflection measuring instrument and the rotation speed measuring instrument respectively, and an output end of the data execution module is connected to control ends of the four hydraulic oil cylinders respectively; the deflection measuring instrument is mounted on a left front wheel of the automobile, the rotation speed measuring instrument is mounted on the left front wheel of the automobile, two of the four hydraulic oil cylinders are respectively mounted between an automobile frame and a front axle, and the other two of the four hydraulic oil cylinders are mounted between the automobile frame and a rear axle; and the four hydraulic oil cylinders are disposed pairwise and symmetrically. Two initiation airbags are arranged between the automobile frame and the front axle, two initiation airbags are also arranged between the automobile frame and the rear axle, and control ends of the four initiation airbags are all electrically connected to the data execution module. The wheel deflection measuring instrument is a wheel deflection measuring instrument that monitors automobile declination and induces a deflection angle of the automobile during instantaneous cornering, the rotation speed measuring instrument is a rotation speed measuring instrument that monitors a rotation speed of a wheel and induces a speed of the automobile during marching, and the controller is a controller that calculates a position change of a centre of gravity at a current speed of the automobile so as to compare the change with a safe position change threshold of the centre of gravity G at the speed of the automobile, control the hydraulic oil cylinders to move, promote an automobile body to be lifted for a certain distance reversely to the position change of the centre of gravity, and guarantee the safe driving of the automobile. The controller is an ECU. All the hydraulic oil cylinders are provided with a grating ruler for measuring an extending distance of the hydraulic oil cylinder, and an output end of the grating ruler is electrically connected to the data acquisition module.

An automobile cornering rollover prevention control method applicable to the automobile cornering rollover prevention control system above includes the following steps of:

step I, manually setting existing parameters that includes a wheel base and an axle base, a standard centre of gravity of an automobile body, and a safe position change threshold of the centre of gravity, the standard centre of gravity of the automobile body being composed of half wheel base data and half axle base data;

step II, obtaining a deflection angle of the wheel and a speed of a left front wheel by the automobile cornering rollover prevention control system during cornering, wherein $\theta_1$ is an included angle between a connecting line of an ascending section and a descending section of two front or rear hydraulic oil cylinders and a horizontal line; $\theta_2$ is an included angle between a connecting line of the positions of the centre of gravity before and after the change of the centre of gravity and the horizontal line; $h_1$ is a distance between the position of the centre of gravity before the change of the centre of gravity and the sections of the two front hydraulic cylinders; and $\theta_{G'}$ is an included angle between a connecting line of the position of the centre of gravity G' after the change and an instantaneous speed centre O, and a wheel axle, a speed $v_{G'}$ and a centripetal force $F_{G'}$ at the centre of gravity of the automobile:

$$v_{G'} = \frac{r_{G'}}{r_L} v_L,$$

$$F_{G'} = m\frac{v_{G'}^2}{r_{G'}},$$

calculating a centripetal force moment in an axle direction of the automobile according to the data above, which is $T_G(\theta_1) = F_{G'}(h_1 + h_2 - \Delta h_1)\cos(\theta_{G'})$ wherein when the automobile rolls over during concerning, an inside wheel leaves the ground; and a rollover torque of the automobile at the moment is $$T_{Gravity}(\theta_1) = \begin{cases} mg(a + \Delta a) & \text{turn left} \\ mg[B - (a + \Delta a)] & \text{turn right} \end{cases},$$

being concluded from equilibrium of forces:

$T_G(\theta_1) = T_{Gravity}(\theta_1)$ and finally obtaining a critical lifted distance $\Delta h_{Critical}$ $$h_{Critical} = c \tan(\theta_1)$$

and c is a distance between a mounting position of the hydraulic cylinder and an axis of symmetry of the automobile; and step III, executing actions, wherein a data processing module controls expansion links of four hydraulic oil cylinders to extend according to an output result of the data processing module, so that the lifted distance $\Delta h$ of the hydraulic oil cylinders of the automobile body reversely to a value of a position change of the centre of gravity is larger than a theoretically critical lifted distance $\Delta h_{Critical}$.

The content above is explained by taking the left wheel as an example, and if the right wheel is taken an example, then a following formula:

$$r_L = \frac{L}{\sin(\theta_L)},$$

$$\theta_{G'} = \begin{cases} \tan^{-1}\left(\frac{L-b}{r_L\cos(\theta_L) - (a+\Delta a) - B}\right) & \text{turn left} \\ \tan^{-1}\left(\frac{L-b}{r_L\cos(\theta_L) + (a+\Delta a) - B}\right) & \text{turn right} \end{cases},$$

$$v_{G'} = \frac{r_{G'}}{r_L} v_L$$

needs to be amended into:

$$r_R = \frac{L}{\sin(\theta_R)},$$

$$\theta_{G'} = \begin{cases} \tan^{-1}\left(\frac{L-b}{r_R\cos(\theta_R) - (a+\Delta a)}\right) & \text{turn left} \\ \tan^{-1}\left(\frac{L-b}{r_R\cos(\theta_R) + (a+\Delta a)}\right) & \text{turn right} \end{cases},$$

$$v_{G'} = \frac{r_{G'}}{r_R} v_R.$$

Such an alternation may be understood and implemented by those skilled in the art with reference to the present application; moreover, the rotation speed measuring instrument and the deflection measuring instrument may also be mounted on different wheels, and the rotation speed measuring instrument may also be mounted on the rear wheel in meanwhile, which shall also fall within the protection scope of the present application.

The expansion links of the four hydraulic oil cylinders are fed back by the grating rulers in real time, and the expansion links of the four hydraulic oil cylinders are finely adjusted by the controller in real time.

If the lifted distance $\Delta h$ of the hydraulic oil cylinders of the automobile body reversely to the value of the position change of the centre of gravity is smaller than the critical lifted distance $\Delta h_{Critical}$, then the controller sends a control signal to an instrument panel, and the instrument panel flashes for alarming, and the initiation airbags are initiated.

The embodiment above is merely a preferred solution of the present invention, and is not intended to limit the present invention in any way. Other amendments and modifications without departing from the technical solution recorded in the claims may also be made.

The invention claimed is:

1. An automobile cornering rollover prevention control system comprising:
a controller;
four hydraulic oil cylinders;
a deflection measuring instrument; and
a rotation speed measuring instrument,
wherein the controller is mounted inside an automobile, and comprises a data acquisition module, a data processing module, and a data execution module, both the data acquisition module and the data execution module are electrically connected to the data processing module, an input end of the data acquisition module is electrically connected to the deflection measuring instrument and the rotation speed measuring instrument respectively, and an output end of the data execution module is electrically connected to control inputs of the four hydraulic oil cylinders respectively, wherein the deflection measuring instrument is mounted on a left front wheel of the automobile, the rotation speed measuring instrument is mounted on the left front wheel of the automobile, two of the four hydraulic oil cylinders are respectively mounted to and positioned between an automobile frame and a front axle, and the other two of the four hydraulic oil cylinders are mounted to and positioned between the automobile frame and a rear axle, and the four hydraulic oil cylinders are disposed pairwise and symmetrically, two initiation airbags are arranged between and connected to the automobile frame and the front axle, two initiation airbags are also arranged between and connected to the automobile frame and the rear axle, and control inputs of the four initiation airbags are all electrically connected to the data execution module, wherein the deflection measuring instrument is a wheel deflection measuring instrument that monitors automobile declination and gathers a deflection angle $\theta_L$ of the automobile during instantaneous cornering, the rotation speed measuring instrument is an instrument that monitors a rotation speed of a wheel and gathers a speed $v_L$ of the automobile during movement, and the controller calculates a position change $\Delta a$ of a center of gravity G at the speed $v_L$ of the automobile so as to compare the change with a safe position change threshold of the center of gravity G at the speed $v_L$ of the automobile, control the four hydraulic oil cylinders to move, promote an automobile body to be lifted for a certain distance $\Delta h$ in the opposite direction to the position change $\Delta a$ of the center of gravity G, wherein the controller is an electronic control unit, wherein all the hydraulic oil cylinders are provided with a grating ruler for measuring an extending distance of the corresponding hydraulic oil cylinder, and an output end of the grating ruler is electrically connected to the data acquisition module,
wherein the controller is configured to perform:
step I, manually setting existing parameters that comprise a wheel base B and an axle base L, the center of gravity G of the automobile body, and the safe position change threshold of the center of gravity G, the center of gravity G of the automobile body being composed of half wheel base data a and half axle base data b;
step II, obtaining, via the wheel deflection measuring instrument, the deflection angle $\theta_L$ of the wheel and obtaining, via the rotation speed measuring instrument, the speed $v_L$ of a left front wheel by the automobile cornering rollover prevention control system during cornering, calculating, by the controller, according to a following formula:

$$\theta_2 = \frac{\theta_1}{2} - \tan^{-1}\left(\frac{B/2 - a}{h_1}\right),$$

$$r_L = \frac{L}{\sin(\theta_L)},$$

$$\theta_{G'} = \begin{cases} \tan^{-1}\left(\frac{L-b}{r_L\cos(\theta_L) - (a+\Delta a) + B}\right) & \text{turn left} \\ \tan^{-1}\left(\frac{L-b}{r_L\cos(\theta_L) + (a+\Delta a) - B}\right) & \text{turn right} \end{cases},$$

$$\Delta a = 2\sqrt{h_1^2 + (B/2 - a)^2}\sin(\theta_1/2)\cos(\theta_2),$$

$$\Delta h_1 = \Delta a \tan(|\theta_2|),$$

$$r_{G'} = \frac{L-b}{\sin(\theta_{G'})},$$

wherein $\theta_1$ is an included angle between a connecting line of an ascending section and a descending section of two front or rear hydraulic oil cylinders and a horizontal line;

wherein $\theta_2$ is an included angle between a connecting line of the positions of the center of gravity before and after the change of the center of gravity and the horizontal line;

wherein $h_1$ is a distance between the position of the center of gravity G before the change of the center of gravity and the sections of the two front hydraulic cylinders; and wherein $\theta_{G'}$ is an included angle between a connecting line of the position of the center of gravity G' after the change and an instantaneous speed center O, which is a point coincident with the front axle or the rear axle, a speed $v_{G'}$ and a centripetal force $F_{G'}$ at the center of gravity G' of the automobile:

$$v_{G'} = \frac{r_{G'}}{r_L}v_L,$$

$$F_{G'} = m\frac{v_{G'}^2}{r_{G'}},$$

calculating a centripetal force moment ($T_G$) in an axle direction of the automobile according to the data above, which is:

$$T_G(\theta_1) = F_{G'}(h_1 + h_2 - \Delta h_1)\cos(\theta_{G'})$$

wherein when the automobile rolls over during concerning, an inside wheel leaves a ground and a rollover torque of the automobile at the moment is:

$$T_{Gravity}(\theta_1) = \begin{cases} mg(a + \Delta a) & \text{turn left} \\ mg[B - (a + \Delta a)] & \text{turn right} \end{cases},$$

based on an equilibrium of forces equation:

$$T_G(\theta_1) = T_{Gravity}(\theta_1);$$

and obtaining a critical lifted distance $\Delta h_{Critical}$:

$$\Delta h_{Critical} = c\tan(\theta_1),$$

wherein c is a distance between a mounting position of the hydraulic cylinder and an axis of symmetry of the automobile; and step III, executing actions based on the critical lifted distance $\Delta h_{Critical}$, which is calculated in step II, wherein the actions include the data processing module controlling expansion links of the four hydraulic oil cylinders to extend according to an output result of the data processing module of $\Delta a$ at the speed $v_L$, so that a lifted distance $\Delta h$ of the four hydraulic oil cylinders of the automobile body in opposition to a value of the position change of the center of gravity G is larger than the critical lifted distance $\Delta h_{Critical}$, wherein $r_{g'}$ is a distance from the instantaneous speed center O to the position of the center of gravity G' after the change in center of gravity, wherein $r_L$ is a distance from the instantaneous speed center O to left front wheel of the automobile, wherein m is a mass of the automobile, wherein q is an acceleration of gravity, wherein c is one-half of the wheel base B.

2. The automobile cornering rollover prevention control system according to claim 1, wherein the expansion links of the four hydraulic oil cylinders are fed back by the grating ruler in real time, and the expansion links of the four hydraulic oil cylinders are adjusted by the controller in real time.

3. The automobile cornering rollover prevention control system according to claim 2, wherein if the lifted distance $\Delta h$ of the four hydraulic oil cylinders of the automobile body in opposition to the value of the position change of the center of gravity G is smaller than the critical lifted distance $\Delta h_{Critical}$, then the controller sends a control signal to an instrument panel, wherein the action further includes the instrument panel flashing for alarming and the initiation airbags initiating.

* * * * *